US009724765B2

(12) United States Patent
Ach et al.

(10) Patent No.: US 9,724,765 B2
(45) Date of Patent: Aug. 8, 2017

(54) ROTATING TOOL, IN PARTICULAR DRILL, AS WELL AS A METHOD FOR MANUFACTURING A ROTATING TOOL OF THIS TYPE

(71) Applicant: Kennametal Inc., Latrobe, PA (US)

(72) Inventors: Eduard Ach, Mossbach (DE); Horst Manfred Jäger, Nürnberg (DE); Fabian Rosenberger, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 169 days.

(21) Appl. No.: 14/687,076

(22) Filed: Apr. 15, 2015

(65) Prior Publication Data
US 2015/0298220 A1 Oct. 22, 2015

(30) Foreign Application Priority Data
Apr. 17, 2014 (DE) .................. 10 2014 207 501

(51) Int. Cl.
B23B 51/02 (2006.01)
B23P 15/32 (2006.01)

(52) U.S. Cl.
CPC .............. B23B 51/02 (2013.01); B23P 15/32 (2013.01); B23B 2240/16 (2013.01); B23B 2251/02 (2013.01); B23B 2251/62 (2013.01); B23C 2210/02 (2013.01); B23C 2210/03 (2013.01);
(Continued)

(58) Field of Classification Search
CPC . Y10T 408/78; Y10T 408/81; Y10T 408/907; Y10T 408/9098; Y10T 408/90987; Y10T 408/90993; B23B 2240/08; B23B 2240/11; B23B 2240/16; B23B 2251/02; B23B 2251/50; B23C 2210/02; B23C 2210/03
See application file for complete search history.

(56) References Cited

U.S. PATENT DOCUMENTS 1,887,372 A * 11/1932 Emmons ................. B23P 15/28
                                                           175/435
2,325,535 A *  7/1943 Nordberg ............ B23B 51/0486
                                                           408/144
(Continued)

FOREIGN PATENT DOCUMENTS

DE              3709647 A1 * 10/1988 ............. B23B 51/02
DE     WO 2010034410 A1 *  4/2010 ............. B23B 51/02
(Continued)

OTHER PUBLICATIONS

Machine translation of DE 3709647, printed Nov. 2016.*
Machine translation of WO 2010034410, printed Nov. 2016.*

Primary Examiner — Daniel Howell
(74) Attorney, Agent, or Firm — Ian K. Samways

(57) ABSTRACT

The rotating tool, in particular a drill, includes a fluted cutting shank made of a resistant material, in particular carbide, extending in an axial direction along a rotational axis. Connecting to the cutting shank in the axial direction is an intermediate shank made of a material of greater elasticity in comparison the resistant material, in particular of tool steel. The intermediate shank includes an insertable cutting insert that may be exchanged. The cutting shank is preferably a cutting shank recycled from a used solid carbide drill.

13 Claims, 2 Drawing Sheets

(52) U.S. Cl.
CPC .......... *Y10T 408/78* (2015.01); *Y10T 408/907* (2015.01); *Y10T 408/9098* (2015.01)

(56) References Cited

U.S. PATENT DOCUMENTS

| | | | | |
|---|---|---|---|---|
| 2,858,718 | A * | 11/1958 | Kohler | B23B 51/02 408/144 |
| 3,040,605 | A * | 6/1962 | Andreasson | B23B 51/02 408/223 |
| 3,304,816 | A * | 2/1967 | Galorneau | B23B 51/0486 175/320 |
| 4,383,784 | A * | 5/1983 | Gulbrandsen | B23P 15/32 408/144 |
| 4,762,445 | A * | 8/1988 | Bunting | B23B 51/02 408/144 |
| 7,083,367 | B2 * | 8/2006 | Delett | B23B 51/06 408/226 |
| 9,156,094 | B2 * | 10/2015 | Durfee | B23B 51/009 |

FOREIGN PATENT DOCUMENTS

| | | | | | |
|---|---|---|---|---|---|
| DE | 102014105908 | A1 | * | 10/2015 | |
| JP | 52050906 | A | * | 4/1977 | |
| JP | 58066607 | A | * | 4/1983 | |
| JP | 60191709 | A | * | 9/1985 | |
| JP | 04082612 | A | * | 3/1992 | |
| JP | 04141317 | A | * | 5/1992 | |
| JP | 08025141 | A | * | 1/1996 | |
| JP | 08336716 | A | * | 12/1996 | |
| JP | 2000043006 | A | * | 2/2000 | |
| TW | DE 102008018252 | | * | 11/2008 | ............ B23B 51/02 |

\* cited by examiner

ROTATING TOOL, IN PARTICULAR DRILL, AS WELL AS A METHOD FOR MANUFACTURING A ROTATING TOOL OF THIS TYPE

CLAIM TO PRIORITY

This application is a National entry application of German Application No. 102014207501.7, filed on Apr. 17, 2014, the entire contents of which is incorporated herein by reference.

FIELD OF THE INVENTION

The invention relates to a rotating tool, in particular a drill, comprising a resistant material cutting shank extending in an axial direction along a rotational axis and provided with chip flutes. The invention additionally relates to a method for manufacturing a rotating tool of this type.

BACKGROUND OF THE INVENTION

In the present invention, rotating tools are generally understood to mean tools of this type for machining workpieces which rotate around their own rotational axis during operation. With rotating tools of this type such as drills, milling tools or reamers, the use of solid carbide drills, in which the entire tools is made of carbide, is known. A solid carbide drill having the features of the preamble of Claim 1 is described in WO 00/47357 A1, for example.

Additionally known are modular tools, in particular drilling tools, in which a replaceable tool head is secured to a carrier shaft made of a tool steel. The tool head, designed for example as tool tip, is secured for example exclusively through clamping by having the tool head with a coupling part inserted in a clamping manner into a coupling receptacle of the carrier shaft. For this purpose, the carrier shaft frequently comprises two end face clamping webs between which the tool head is held clamped. Modular drilling tools of this type are disclosed in DE 10 2012 200 690 A1 or WO 03/070408 A1, for example.

Solid carbide drills are significantly more expensive in comparison to tools made of tool steels. Using solid carbide drills thus usually entails significantly higher expenses. On the other hand, a solid carbide drill is less prone to wear owing to its significantly greater hardness. In addition, it is usually significantly stiffer in comparison to a steel shaft and tends to vibrate less. This higher stiffness is especially advantageous particularly with longer drills.

The improved wear resistance applies particularly also to what are referred to as minor cutting edges or guide chamfers, which run along chip flutes which start at a tool tip and extend along a cutting shank.

SUMMARY OF THE INVENTION

The object is achieved according to the invention by a rotating tool, in particular a drill, having the features of Claim 1. The rotating tool comprises a fluted cutting shank made of a resistant material and extending in an axial direction along a rotational axis. This resistant material is in particular carbide as is usually found in carbide drills. The resistant material can alternatively be what is referred to as a cermet or also a ceramic. These resistant materials are generally very hard materials having a high inherent rigidity and good wear resistance. Connecting to this cutting shank in the axial direction is an intermediate shank made of a different material in comparison to the resistant material, in particular a tool steel. The material is generally softer and/or more elastic than the resistant material. Secured to this material in turn is a cutting insert made of a cutting material of greater hardness in comparison to the material of the intermediate shank.

Formed on the cutting shank, preferably along the chip flutes, are minor cutting edges and/or support or guide chamfers. However, minor cutting edges of this type as well as support and guide chamfers do not necessarily need to be formed on the cutting shank. The cutting shank thus also does not necessarily need to have a cutting function.

This embodiment is based in particular on the notion of improving a modular tool comprised of a carrier shaft made of tool steel and a tool head made of a cutting material to the extent that the cutting shank is prepared from the resistant material and the modularity is simultaneously maintained through the introduced cutting insert. Making the intermediate shaft from a material of greater elasticity allows a coupling site for the cutting insert to be reliably formed.

Accordingly, the cutting insert is preferably also a cutting insert in the form of a tool head that is secured so as to be exchangeable. The cutting insert constitutes in particular a tool tip and is thus usually of complex geometry, having multiple major cutting edges arranged in a front end face.

The intermediate shank thus preferably comprises on its end face clamping webs between which the cutting insert is held clamped. The cutting insert is expediently held in place exclusively through clamping without additional fastening elements such as screws being arranged.

Sufficient elasticity for accommodating the cutting insert is required particularly in an embodiment of this type having the clamping webs. The required elasticity is provided by the intermediate shank made of the elastic material. At the same time, the cutting shank has a high wear resistance so that overall a modular rotating tool is created which has a long service life and results in lower operating costs overall.

According to a preferred embodiment, the cutting shank is a cutting shank obtained from a previously used solid resistant material tool, in particular a solid carbide tool. Solid carbide tools are disposed of if regrinding is not or no longer possible. Using the previously used tool for the cutting shank is thus based on a recycling concept aimed at reducing costs. This practice capitalizes on the fact that the cutting shank is usually subjected to particular wear only in the front area near the tip, but the wear in the rearward area is at most minor, thus making further use possible. Overall, the material requirements of the comparatively more expensive carbide is kept low so that, on the whole, a cost-effective rotating tool with good wear resistance can be made available.

In an expedient development, chip flutes running along the fluted cutting shank are continued in the intermediate shank. The intermediate shank is thus likewise designed as a fluted shaft area. The chip flutes are expediently continued in the intermediate shank at the same helical inclination so that they align with the chip flutes in the cutting shank. In this case, guide and support chamfers as well as possible minor cutting edges are likewise preferably formed on the intermediate shank, each of which also continues in the cutting shank along the chip flutes.

To facilitate as reliable and secure a connection as possible between the intermediate shank and the cutting shank, these components are materially bonded to one another.

The intermediate shank is expediently bonded to the cutting shank via welding. Alternatively, the two parts can in principle also be bonded to one another via soldering. However, the soldering process heats the resistant material, in particular the carbide, significantly more than welding, which can adversely lead to the carbide becoming brittle at the interface with the intermediate shank, thereby making the connection point less suitable for transmitting the required forces.

According to an especially preferred embodiment variant, the intermediate shank is formed via a selective, layer-by-layer laser application. The principle of a layer-by-layer and selective application of this type is commonly known and is generalized under the term 3D printing. The basic principle is also described, for example, in the article, "Selective Laser Melting of thin wall parts using pulse shaping" by K. A. Mumtatz, N. Hopkinson in the "Journal of Materials Processing Technology", 210 (2010), 279-287. With this method, the desired geometry is generally produced layer-by-layer via successively applying powder layer-for-layer and fusing the powder particles to one another along the desired geometry by means of laser treatment. The layer-by-layer construction allows highly complex geometries to be formed.

To facilitate an optimal connection between intermediate shank and cutting shank, a connection surface is arranged between these two parts which is designed at least in partial sections to be at an angle other than 90° in relation to the axial direction. The connection surface is thus oriented, at least in partial sections, diagonally to the rotational axis. According to a first embodiment variant, it is tilted completely diagonally so that a diagonally tilted plane is formed which defines the connection surface. Alternatively, the connection surface can also be designed overall as roof-shaped.

In this case, the angle ranges preferably between 30° and 85°. This diagonal orientation significantly increases the contact surface altogether, thereby increasing the retention force between the intermediate shank and cutting shank owing to the larger surface.

As an alternative to or in addition to being diagonally tilted, the connection surface is preferably profiled or roughened. This also serves to increase the holding force between cutting shank and intermediate shank. In this case, the term profiling is understood to mean, for example, a corrugation of the surface. The profiling has a profile height in axial direction of less than 1 mm, for example. In the case of roughening, in contrast, no defined structure is formed but rather the entire surface is in particular uniformly roughened with a roughness significantly less than the specified profile depth.

As an alternative to or in addition to profiling or roughening, in an expedient embodiment the cutting shank and intermediate shank comprise coupling elements which engage with one another in the axial direction, i.e. overlap in the axial direction. Coupling elements of this type are, in particular, a stud and a stud receptacle, teeth or also an overall roof-like configuration of the end faces. Coupling elements of this type typically extend over multiple millimeters in the axial direction. This would in turn increase contact surface, for one. In an appropriate embodiment, the coupling elements are additionally designed also as torque elements via which the torque is transferred from the cutting shank to the intermediate shank during operation.

In general, the intermediate piece expediently has a length extending in the axial direction which ranges between 0.2 and 1.5 times a nominal diameter of the rotating tool. In particular, the axial length ranges between 0.8 and 1.2 times the nominal diameter. This comparatively long axial length ensures sufficient elasticity in the area of the cutting insert so that the loads occurring during the machining procedure can be safely and reliably absorbed by the elastic intermediate shank.

The object is furthermore achieved according to the invention via a method for manufacturing a rotating tool of the type specified having the features of Claim 14. The presented advantages and preferred embodiments with regard to the rotating tool also correspondingly apply to the method.

In an especially expedient embodiment of the method, it is provided that a used solid carbide tool is prepared for furnishing the cutting shank. For this purpose, a front tip of the used solid carbide tool is removed and the desired connection surface is formed on the sides of the cutting shank. These actions allow a significant reduction in costs to be achieved. In particular, they enable effective recycling of used solid carbide drills. The problem is solved according to the invention by a machining tool having the features of Claim 1. The machining tool is in particular a rotating tool, i.e. a machining tool which rotates around a rotational axis during operation. In this particular case it is a drill or milling tool.

BRIEF DESCRIPTION OF THE DRAWINGS

An exemplary embodiment of the invention is explained in greater detail on the basis of Figures, which show.

Parts having the same effect are given the same reference numbers in Figures.

DETAILED DESCRIPTION OF THE INVENTION

Figure 1:
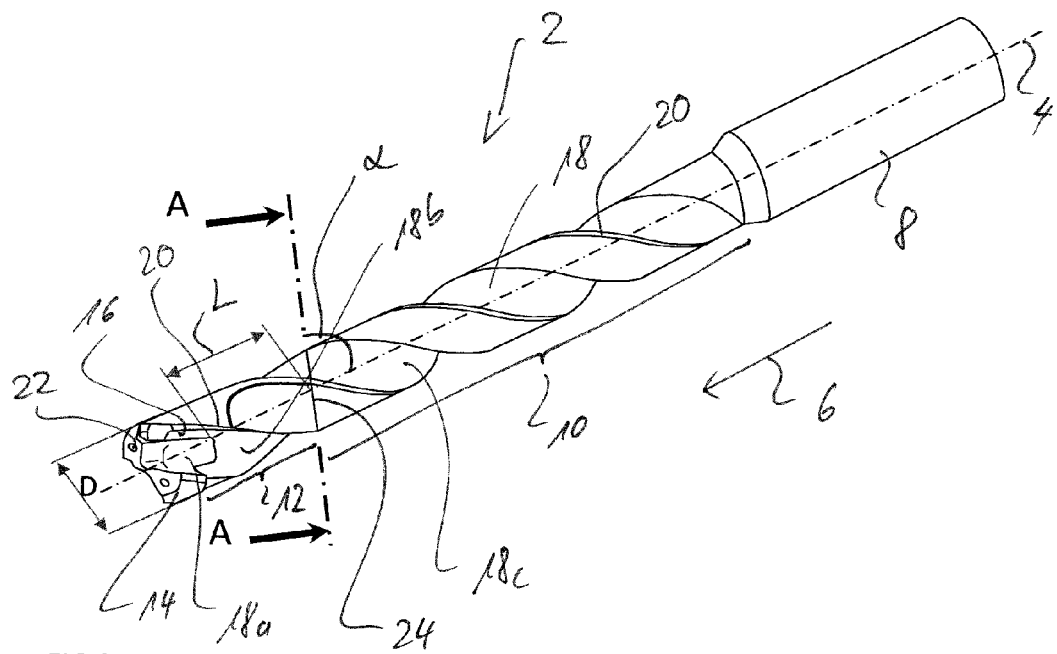
FIG. 1 shows a perspective view of a rotating tool designed as a drill.

A rotating tool designed as a drill 2 shown in FIG. 1 extends along a rotational axis 4 in axial direction 6. In the rearward area it comprises a clamping shaft 8 to which connects first a cutting shank 10 and then an intermediate shank 12, to which intermediate shank 12 a cutting insert 14 is secured on the end face.

The cutting shank 10 and the clamping shaft 8 are made of a resistant material, in particular carbide. In contrast, the intermediate shank 12 is made of a material of greater elasticity than the cutting insert 14, in particular a tool steel. The intermediate shank 12 is preferably made of an HSS steel. The various materials thus differ in particular in terms of their modulus of elasticity. The cutting shank 10 in principle has a higher modulus of elasticity than the intermediate shank 12. While the modulus of elasticity of the intermediate shank 12 is typically around 210 kN/mm$^2$, the modulus of elasticity of the cutting shank 10 is higher, ranging in particular between 430 and 630 kN/mm$^2$.

The cutting insert 14 is overall a tool head which is preferably secured to the intermediate shank 12 via clamping. For this purpose, the intermediate shank 12 comprises clamping webs 16 (see also FIGS. 3A through 3C) between which the cutting insert is held clamped.

The drill 2 features chip flutes 18 which, in the exemplary embodiment, extend helically. The chip flutes 18 are divided into multiple sections, specifically into a front sub-section 18a in the cutting insert 14, a middle sub-section 18b in the intermediate shank 12 and a rear sub-section 18c in the cutting shank 10. In the exemplary embodiment, the sub-section 18c extends over the entire length of the cutting shank 10. The individual sub-sections 18a, b, c all have the same helical inclination and align with one another.

In the exemplary embodiment, the cutting insert 14 is a drill bit having a cutting geometry typical for drill bits, i.e. having major cutting edges which extend from a drill center up to a radially outer cutting corner. The major cutting edges are usually connected to one another via a chisel edge. Adjoining the major cutting edges in circumferential direction is a free surface which in each case extends to the subsequent chip flute 18a.

In the exemplary embodiment it is additionally provided that the cutting insert 14 extends to a circumferential side and forms an circumferential jacket surface of the drill 2. The clamping webs 16 are thus covered by the cutting insert at their end faces. Alternatively, the cutting insert 14 is held between the clamping webs without covering them. The cutting insert is preferably held exclusively by clamping. It is usually installed by being inserted axially and then twisted around the rotational axis 4 in the form of a bayonet closure.

Figures 3A, 3B, 3C:
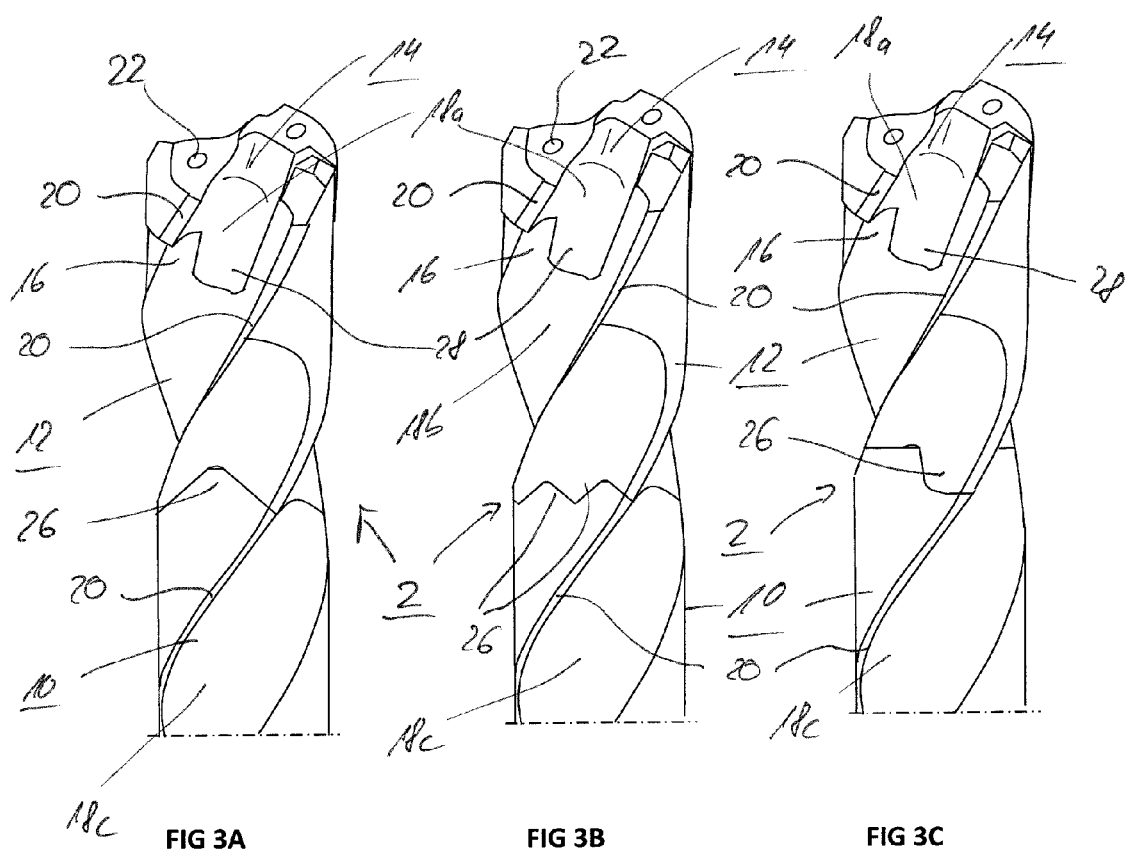
FIG. 3A through 3C show side views of a drill according to the invention having various interfaces between cutting shank and intermediate shank.

In the exemplary embodiment, the cutting insert 14 also comprises a guide chamfer 20 connecting to the front sub-section 18a of the chip flute in circumferential direction (see also FIGS. 3A through 3C). This guide chamfer 20 continues on the intermediate shank 12 and the cutting shank 10.

In principle, other coupling concepts for detachable connection of the cutting insert 4 designed as drill bit 4 are also possible, for example with the aid of screws. In all of these coupling concepts a coupling stud 28 is designed with which the cutting insert is accommodated in a stud receptacle on the intermediate shank 12, particularly via clamping.

It is also apparent that the drill 2 comprises coolant channels 22 in the exemplary embodiment. These extend over the entire length of the drill 2 from the clamping shaft 8 to the cutting insert 14. At each of the junctions between the individual parts, i.e. between cutting shank 10 and intermediate shank 12 as well as between intermediate shank 12 and cutting shank 14, the respective individual sections of the coolant channels 22 align with one another. In the exemplary embodiment, the coolant channels 22 exit frontally at an end face of the cutting insert 14. Alternatively, it is also possible for the coolant channels 22 to exit in the sub-sections 18a of the chip flutes of the cutting insert 14 or also in the sub-sections 18b of the intermediate shank 12, for example.

The drill 2 has an overall nominal diameter D which defines the distance between the two radially outer lying cutting corners of the major cutting edges. The intermediate shank 12 additionally has an axial length L which preferably lies roughly within the range of the nominal diameter D. Axial length L is understood to mean the distance between the junctions of the intermediate shank 12 to the cutting shank 10 and to the cutting shank 14, respectively, lying on the rotational axis 4.

The intermediate shank 12 is preferably an intermediate shaft produced layer-by-layer through selective laser welding. Alternatively, it is a prefabricated, solid component. In both cases, a material bond exists at the interface between intermediate shank 12 and cutting shank 10. If a solid section is used as intermediate shank 12, it is preferably secured through welding.

To facilitate an optimal adhesive bond at the interface between cutting shank 10 and intermediate shank 12, different measures are provided which are explained below and can also be used in combination.

Figures 2A, 2B, 2C:
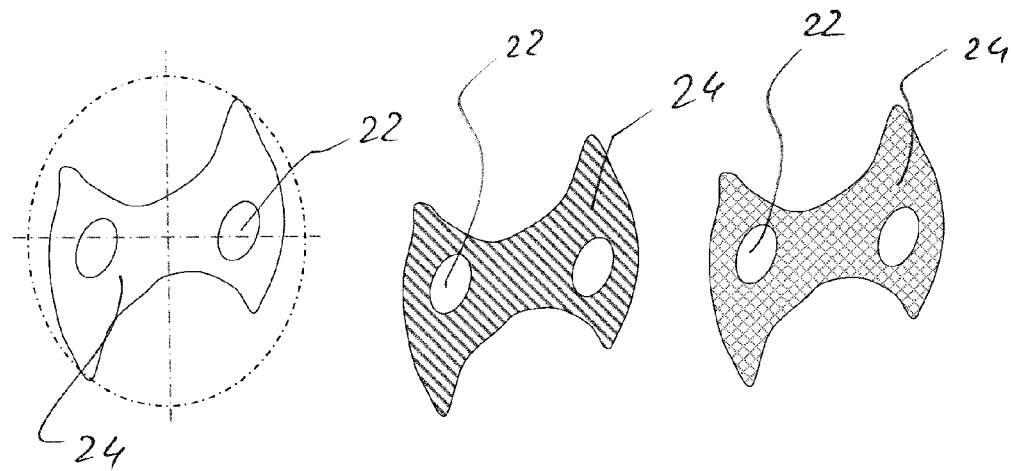
FIG. 2A through 2C show sectional views along the section line A-A in FIG. 1.

As FIG. 1 illustrates, it is first provided that a connection surface 24 is oriented tilted diagonally to the axial direction 6 at an angle α. In the exemplary embodiment, the angle α is around 70°. The connection surface 24 lies consistently on a single plane and thus extends across the entire diameter at the same angle α. FIGS. 2A through 2C show a top view of the connection surface 24 looking toward the cutting shaft 10. FIG. 2A additionally illustrates the circumferential outline of the cutting shank 10.

The connection surface is furthermore preferably prepared at both parts, namely on the cutting shank 10 and on the intermediate shank 12, for a reliable adhesive bond. For example, the connection surface 24 is profiled, as is schematically illustrated in FIG. 2B. In this case, profiling is realized as a groove structure having a depth of <1 mm in axial direction 6, for example.

According to FIG. 2C, a mere roughening is schematically illustrated as an alternative to the profiling.

Finally, FIGS. 3A through 3C are sketches of different embodiment variants, wherein the two components cutting shank 10 and intermediate shank 12 each form coupling elements 26 which engage with one another in axial direction 6. In the embodiment variant according to FIG. 3A the coupling elements 26 are designed as roof-shaped, with only one coupling element 26 of roof-shaped design respectively being provided. In contrast, the coupling elements 26 according to FIG. 3B form a toothing in which multiple coupling elements 26 are thus formed, each of which engages with one another in a tooth-like pattern. In the exemplary embodiment the individual teeth are designed to have a roof-like profile.

Finally, FIG. 3C shows an embodiment variant in which the coupling elements 26 engage with one another to form a step. In particular, the coupling elements 26 are formed on a radially outer rim so that they act as torque driver.

FIGS. 3A through 3C also clearly illustrate once again the previously described design of the cutting insert 14. This part features the coupling stud 28 which is inserted in a corresponding coupling receptacle of the intermediate shank 12.

What is claimed is:

1. A rotating tool, comprising:
   a cutting shank made of a resistant material extending in an axial direction along a rotational axis and provided with chip flutes;
   an intermediate shank which connects to the cutting shank in the axial direction and is made of a different material from the resistant material; and
   a cutting insert which is interchangeably secured to the intermediate shank;
   the intermediate shank comprising, at an end face thereof, clamping webs;
   wherein the cutting insert is held clamped between the clamping webs.

2. The rotating tool as claimed in claim 1, wherein the intermediate shank comprises an axial length (L) extending in axial direction, which axial length (L) ranges between 0.2 times and 1.5 times a nominal diameter (D) of the rotating tool.

3. The rotating tool as claimed in claim 1, wherein the cutting shank is made from a previously used solid tool formed from the resistant material.

4. The rotating tool as claimed in claim 1, wherein the chip flutes run along the cutting shank and continue in the intermediate shank.

5. The rotating tool as claimed in claim 1, wherein the cutting shank is materially bonded to the intermediate shank.

6. The rotating tool as claimed in claim 1, wherein the intermediate shank is welded to the cutting shank.

7. The rotating tool as claimed in claim 1, wherein the intermediate shank is formed via selective layer-by-layer laser application.

8. The rotating tool as claimed in claim 1, further comprising a connection surface between the cutting shank and the intermediate shank which, at least in partial sections, is tilted at an angle ($\alpha$) other than 90° in relation to the axial direction.

9. The rotating tool as claimed in claim 8, wherein the angle ($\alpha$) lies in the range between 30° and 85°.

10. The rotating tool as claimed in claim 1, further comprising a connection surface between the cutting shank and the intermediate shank which is profiled or roughened.

11. The rotating tool as claimed in claim 1, wherein the cutting shank and the intermediate shank comprise coupling elements which engage with one another.

12. A method for manufacturing a rotating tool as claimed in claim 1, via:
   providing the cutting shank made of a resistant material;
   connecting the intermediate shank to the cutting shank; and
   securing the cutting insert to the intermediate shank.

13. The method as claimed in claim 12, wherein providing the cutting shank comprises:
   providing a previously used solid tool formed from the resistant material; and
   removing a front tip of the solid tool.

* * * * *